US012684667B2

(12) United States Patent
Ishima

(10) Patent No.: US 12,684,667 B2
(45) Date of Patent: Jul. 14, 2026

(54) LIGHT-EMITTING DEVICE

(71) Applicant: KOITO MANUFACTURING CO., LTD., Tokyo (JP)

(72) Inventor: Shigemi Ishima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 25 days.

(21) Appl. No.: 18/871,216

(22) PCT Filed: Jun. 2, 2023

(86) PCT No.: PCT/JP2023/020615
§ 371 (c)(1),
(2) Date: Dec. 3, 2024

(87) PCT Pub. No.: WO2023/238786
PCT Pub. Date: Dec. 14, 2023

(65) Prior Publication Data
US 2025/0338374 A1      Oct. 30, 2025

(30) Foreign Application Priority Data

Jun. 8, 2022     (JP) ................................. 2022-093042
Jul. 13, 2022    (JP) ................................. 2022-112517

(51) Int. Cl.
*G01S 7/481*      (2006.01)
*G01S 17/931*     (2020.01)
*H05B 45/3725*    (2020.01)

(52) U.S. Cl.
CPC ........ *H05B 45/3725* (2020.01); *G01S 7/4815* (2013.01); *G01S 17/931* (2020.01)

(58) Field of Classification Search
CPC .. G01S 17/4815; G01S 17/931; G01S 7/4815; G01S 7/484; H05B 45/3725
See application file for complete search history.

(56) References Cited

U.S. PATENT DOCUMENTS 10,277,006 B2      4/2019  Miyagawa et al.
2015/0280394 A1   10/2015  Usuki
(Continued)

FOREIGN PATENT DOCUMENTS

JP      2015-192384 A      11/2015
JP      2021-028924 A      2/2021
(Continued)

OTHER PUBLICATIONS

Extended European Search Report issued on Aug. 19, 2025 for the corresponding EP Patent Application No. 23819766.9.
(Continued)

*Primary Examiner* — Patrick C Chen
(74) *Attorney, Agent, or Firm* — Rankin, Hill & Clark LLP

(57) ABSTRACT

Provided is a light-emitting device capable of turning on a plurality of light sources with a simple configuration. The light-emitting device includes n (n≥2) light sources, n power supply circuits each provided for the n light sources, and a switch provided between a ground-side node of each of the n light sources and a ground. Each power supply circuit generates a power supply voltage for a corresponding one of the n light sources on the basis of a first signal, and stops generating the power supply voltage on the basis of a second signal, and the switch is turned on the basis of a light-on instruction and is turned off on the basis of a light-off instruction when the power supply voltage for the one light source is generated.

5 Claims, 9 Drawing Sheets

(56)  References Cited

U.S. PATENT DOCUMENTS

| | | | | |
|---|---|---|---|---|
| 2018/0109073 A1 * | 4/2018 | Miyagawa | .............. | H01S 5/042 |
| 2018/0323576 A1 | 11/2018 | Crawford | | |
| 2020/0178361 A1 * | 6/2020 | Oka | ...................... | G01S 7/4815 |
| 2021/0313768 A1 | 10/2021 | Tsuchiyama | | |
| 2022/0294183 A1 | 9/2022 | Yawata et al. | | |
| 2023/0006418 A1 | 1/2023 | Yu et al. | | |

FOREIGN PATENT DOCUMENTS

| | | | | |
|---|---|---|---|---|
| WO | 2020/044818 A1 | 3/2020 | | |
| WO | WO-2021174390 A1 * | 9/2021 | ........... | H01S 5/4025 |

OTHER PUBLICATIONS

International Search Report dated Aug. 1, 2023 filed in PCT/JP2023/020615.

* cited by examiner

LIGHT-EMITTING DEVICE

TECHNICAL FIELD

The present invention relates to a light-emitting device.

BACKGROUND ART

A measurement device that measures a distance to an object on the basis of light emitted from a light emitting element such as a laser diode is generally provided with a drive circuit that drives the light emitting element (e.g., Patent Literature 1).

CITATION LIST

Patent Literature

Patent Literature 1: JP-A-2021-28924

SUMMARY OF INVENTION

Problems to be Solved by Invention

The drive circuit disclosed in Patent Literature 1 is provided with a level shift circuit, and therefore, the configuration of the drive circuit is generally complicated.

The present invention has been made in view of the above-described conventional problems, and an object of the present invention is to provide a light-emitting device capable of turning on a plurality of light sources with a simple configuration.

Solution to Problems

One aspect of the present invention is a light-emitting device including n (n≥2) light sources, n power supply circuits each provided for the n light sources, and a switch provided between a ground-side node of each of the n light sources and a ground, each power supply circuit generates a power supply voltage for a corresponding one of the n light sources on the basis of a first signal, and stops generating the power supply voltage on the basis of a second signal, and the switch is turned on the basis of a light-on instruction and is turned off on the basis of a light-off instruction when the power supply voltage for the one light source is generated.

Effects of Invention

According to the present invention, it is possible to provide the light-emitting device capable of turning on the plurality of light sources with the simple configuration.

BRIEF DESCRIPTION OF DRAWINGS

FIG. 2 is a diagram showing one example of a light-emitting device 20a.

DESCRIPTION OF EMBODIMENTS

Figure 1:
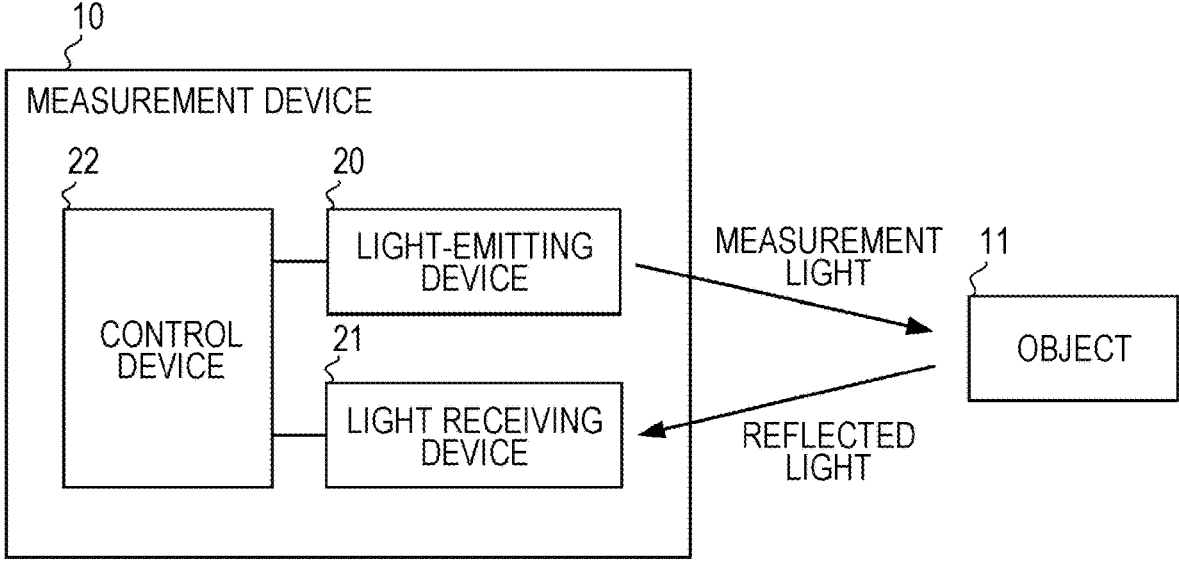
FIG. 1 is a diagram showing one example of a measurement device 10.

At least the following matters will be apparent from description of the present specification and illustration of the accompanying drawings. Here, the same or equivalent components, members and the like illustrated in the drawings are denoted by the same reference numerals, and overlap description thereof will be omitted as necessary.

Present Embodiment

<<Outline of Measurement Device 10>>

A measurement device 10 is a device that has the function of a so-called light detection and ranging or laser imaging detection and ranging (LiDAR) and measures a distance to an object 11. Specifically, the measurement device 10 emits measurement light and measures the distance to the object 11 on the basis of a time of flight (TOF) method for detecting light reflected by the surface of the object 11. Further, the measurement device 10 is installed, for example, in a vehicle (not shown), and includes a light-emitting device 20, a light receiving device 21, and a control device 22.

The object 11 is, for example, a vehicle different from the vehicle on which the measurement device 10 is installed, a person, or a structure such as a street lamp or a building.

The light-emitting device 20 emits the measurement light to the object 11 under the control of the control device 22 (described later). Note that details of the light-emitting device 20 will be described later.

The light receiving device 21 receives the reflected light from the object 11, and outputs information (e.g., timing or level) regarding the reflected light to the control device 22.

The control device 22 is a device that integrally controls the measurement device 10. Specifically, the control device 22 controls emission of the measurement light from the light-emitting device 20, and measures the distance to the object 11 by the time of flight (TOF) method on the basis of the output from the light receiving device 21. Note that although not shown in the figure, the control device 22 includes, for example, a storage device and an arithmetic device that executes a program stored in the storage device.

<<Details of Light-Emitting Device 20a>>

Figure 2:
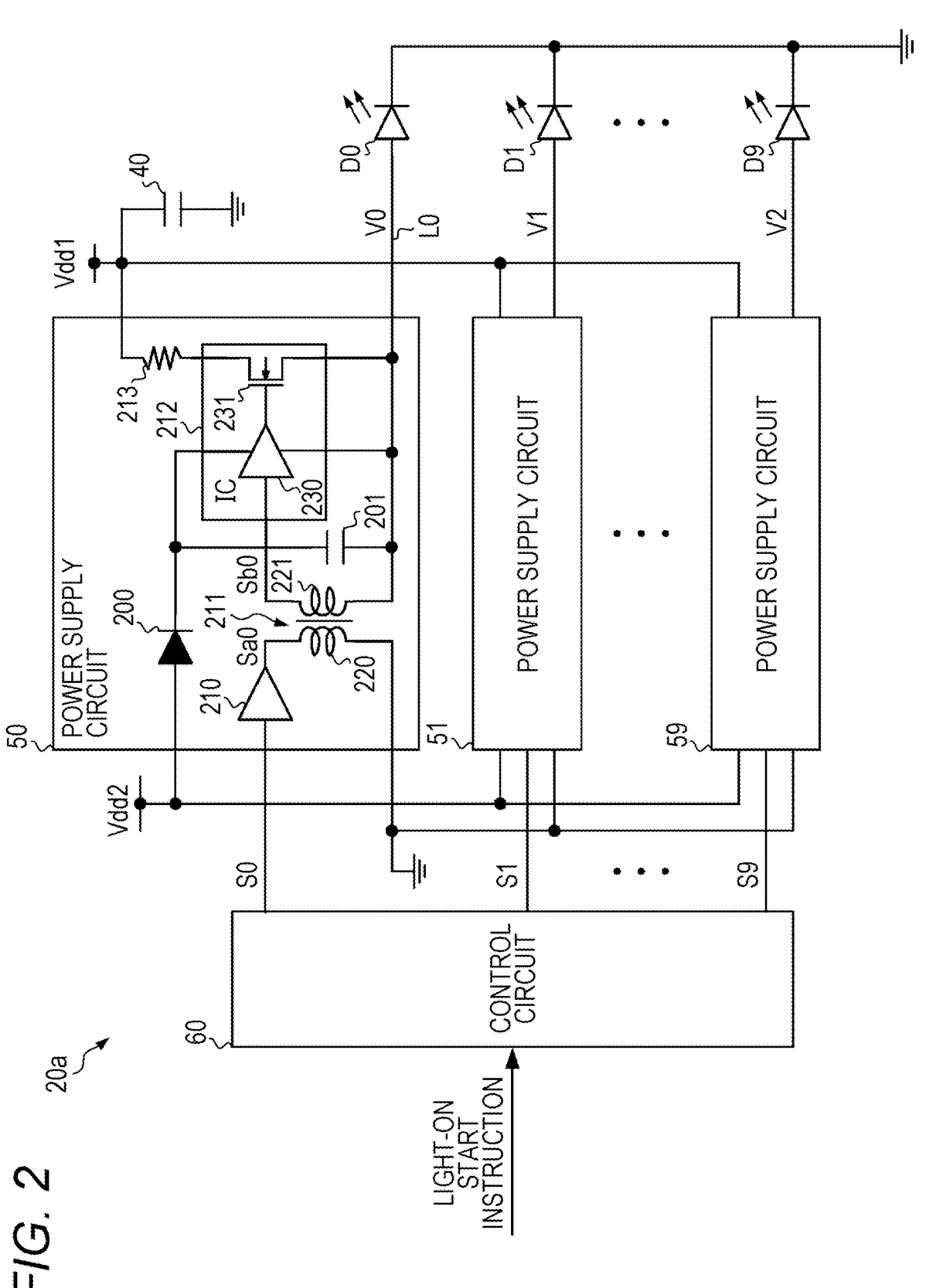

FIG. 2 is a diagram showing one example of the configuration of a general light-emitting device 20a. The light-emitting device 20a includes light sources D0 to D9, a capacitor 40, power supply circuits 50 to 59, and a control circuit 60. Note that in FIG. 2, for the sake of convenience, part of the configuration (light sources D2 to D8, power supply circuits 52 to 58) of the light-emitting device 20a is omitted.

Light Source

Figure 3:
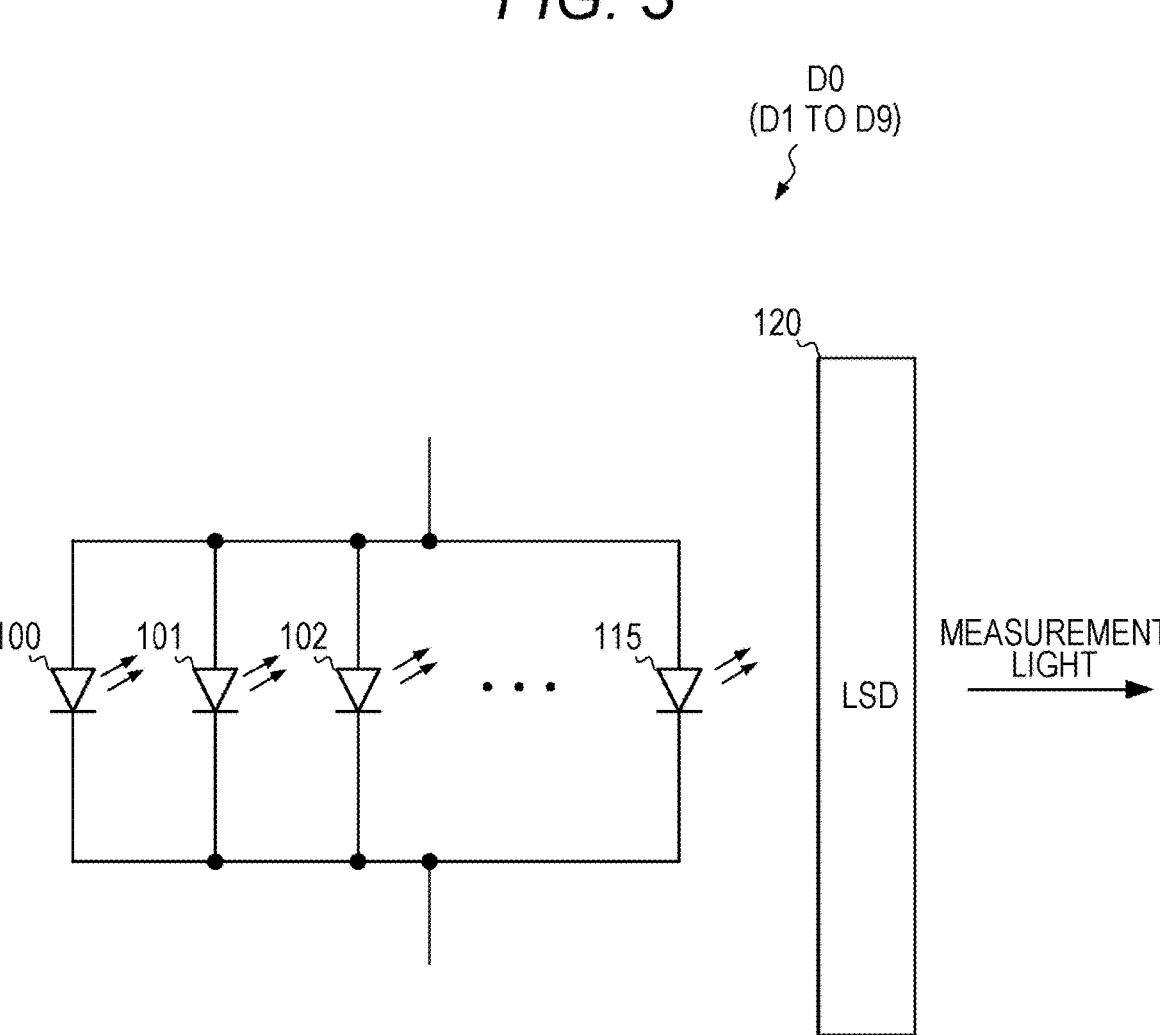
FIG. 3 is a diagram showing one example of the configuration of a light source D0.

The light source D0 includes, for example, a surface emitting laser (vertical cavity surface emitting laser) capable of emitting measurement light in an infrared range. Specifically, as in an example shown in FIG. 3, the light source D0 includes, for example, 16 laser diodes 100 to 115 and an optical member 120 that adjusts distribution of light from the laser diodes 100 to 115.

The cathodes of the laser diodes 100 to 115 are common, and the anodes are also common. Thus, the light emitted from each of the laser diodes 100 to 115 is the measurement light from one light source D0. Note that the light source D0 includes the 16 laser diodes 100 to 115 here, but may include another number (for example, 8 or 32) of laser diodes.

The optical member 120 is, for example, a light shaping diffuser (LSD), and is a member that diffuses (i.e., adjusts) the light emitted from each of the laser diodes 100 to 115 such that desired light distribution of the light from the light source D0 is obtained. Note that the LSD is used as the optical member 120 here, but any member may be used as long as the light distribution of the light from the light source D0 can be in a desired pattern.

Since each of the light sources D1 to D9 includes the same surface emitting laser (hereinafter, simply referred to as "VCSEL") and the same optical member 120 as those of the light source D0, detailed description thereof is omitted here. The nine light sources D0 to D9 correspond to "n (n is an integer of 2 or more)" light sources. In addition, hereinafter, the light source DO may be described as a VCSEL for the sake of convenience.

Capacitor 40

The capacitor 40 is an element that stabilizes a predetermined power supply voltage Vdd1 (e.g., several tens of V) supplied to the power supply circuits 50 to 59. The predetermined power supply voltage Vdd1 is applied to the capacitor 40.

Details of Power Supply Circuit 50

The power supply circuit 50 is a circuit that generates a power supply voltage V0 for turning on the light source D0 on the basis of the power supply voltage Vdd1 and a signal S0 from the control circuit 60. Specifically, the power supply circuit 50 generates the power supply voltage V0 when a high-level (hereinafter, "H-level") signal S0 is input from the control circuit 60 to turn on the light source D0. On the other hand, the power supply circuit 50 stops generating the power supply voltage V0 when a low-level (hereinafter, "L-level") signal S0 is input from the control circuit 60 to turn off the light source D0.

The power supply circuit 50 includes a diode 200, a capacitor 201, a buffer 210, a transformer 211, an integrated circuit (IC) 212, and a resistor 213.

The diode 200 is an element that generates a power supply voltage for operating the IC 212 (described later) together with the capacitor 201. A power supply voltage Vdd2 (e.g., 5 V) is applied to the anode of the diode 200, and the cathode of the diode 200 is connected to the capacitor 201.

When the capacitor 201 is charged with the current from the diode 200, the power supply voltage for operating the IC 212 is generated.

The buffer 210 outputs a signal Sa0 having the same logic level as that of the signal S0 to the transformer 211. Specifically, the buffer 210 outputs the H-level signal Sa0 on the basis of the H-level signal S0, and outputs the L-level signal Sa0 on the basis of the L-level signal S0. Here, the signal S0 is a signal for controlling ON/OFF of a driving transistor 231 (described later) of the IC 212, the L-level of the signal S0 is, for example, 0 V, and the H-level is, for example, 3 V.

The transformer 211 is an isolated transformer that converts and outputs a DC level while maintaining the amplitude of an input signal, and includes a primary coil 220 and a secondary coil 221 electromagnetically coupled to the primary coil 220.

Here, the transformer 211 functions as a so-called level shift circuit. Thus, the transformer 211 converts the signal Sa0 of which the logic level changes with reference to a ground voltage (0 V) into a signal Sb0 changing with reference to the power supply voltage V0. That is, the transformer 211 causes the secondary coil 221 to generate the H-level signal Sb0 when the signal Sa0 is at the H-level, and causes the secondary coil 221 to generate the L-level signal Sb0 when the signal Sa0 is at the L-level.

Here, the transformer 211 is used as the so-called level shift circuit, but the present invention is not limited thereto and other configurations (e.g., circuit including a photocoupler) may be used.

The IC 212 generates the power supply voltage V0 to the light source D0 when the signal Sb0 from the secondary coil 221 is at the H-level, and stops generating the power supply voltage V0 when the signal Sb0 is at the L-level. The IC 212 includes a buffer 230 and the driving transistor 231.

The buffer 230 outputs a signal having the same logic level as that of the signal Sb0 to the driving transistor 231. Specifically, when the H-level signal Sb0 is output from the secondary coil 221, the buffer 230 outputs the H-level signal to the driving transistor 231. As a result, the driving transistor 231 is turned on.

On the other hand, when the L-level signal Sb0 is output from the secondary coil 221, the buffer 230 outputs the L-level signal to the driving transistor 231. As a result, the driving transistor 231 is turned off.

Here, when the driving transistor 231 is turned on, the power supply voltage V0 of a line L0 on the anode side of the light source D0 increases to almost the power supply voltage Vdd1. Since the high-level power supply voltage V0 is applied to the line L0 on the anode side of the light source D0, the light source D0 is turned on (emits the measurement light).

Note that the resistor 213 is an element for limiting the current flowing through the light source D0. When the driving transistor 231 is turned on, the voltage of the line L0 to which the source electrode of the driving transistor 231 is connected increases to almost the power supply voltage Vdd1 (e.g., several tens of V). Thus, in order to maintain the ON state of the driving transistor 231, it is necessary to continuously apply a voltage higher than the threshold of the driving transistor 231 from the voltage of the line L0 to the gate electrode of the driving transistor 231.

In the power supply circuit 50 of FIG. 2, the transformer 211 shifts the DC level of the signal Sa0, and outputs the signal Sb0 to the secondary side. Thus, the logic level (H-level or L-level) of the signal Sb0 on the secondary side of the transformer 211 changes with reference to the voltage of the line L0. As a result, in the power supply circuit 50, ON/OFF of the driving transistor 231 can be controlled on the basis of the signal S0 changing with reference to the ground voltage (0 V).

Note that when the signal S0 changes to the L-level and the driving transistor 231 is turned off, the power supply circuit 50 stops generating the power supply voltage V0. As a result, the supply of the power supply voltage V0 to the light source D0 is also stopped, and therefore, the light source D0 is turned off.

Power Supply Circuits 51 to 59

Similarly to the power supply circuit 50, each of the power supply circuits 51 to 59 generates a power supply voltage V1 to V9 for the light source D1 to D9 on the basis of a signal S1 to S9. Thus, detailed description of the power supply circuits 51 to 59 is omitted here.

Control Circuit 60

The control circuit 60 controls each of the power supply circuits 50 to 59 such that the light sources D0 to D9 are sequentially turned on the basis of a light-on start instruction from the control device 22 of FIG. 1. Here, "the light sources D0 to D9 are sequentially turned on" means that, for example, the ten light sources D0 to D9 are turned on one by one in the order of the light sources D0, D1, . . . , and D9. Thus, for example, when the light source D0 of the light sources D0 to D9 is turned on, the other light sources D1 to D9 are turned off, and for example, when the light source D1 is turned on, the light sources D0, D2 to D9 are turned off.

Thus, the control circuit 60 sets the level of one signal corresponding to the light source to be turned on among the signals S0 to S9 to the H-level, and sets the levels of the other nine signals to the L-level. By outputting such signals S0 to S9, the light sources D0 to D9 are sequentially turned on.

Meanwhile, each of the power supply circuits 50 to 59 of the light-emitting device 20a of FIG. 2 includes many components such as the transformer 211 and the IC 212. For this reason, in general, a mounting space occupied by the power supply circuits 50 to 59 in the light-emitting device 20a is wide.

In addition, the transformer 211 that shifts the level of the signal S0 and the capacitor 201 that generates the power supply voltage for the buffer 230 include a relatively-large parasitic inductor or parasitic capacitance, the accuracy of the power supply voltage V0 for the light source D0 may be degraded. For this reason, in the measurement device 10 of the present embodiment, a light-emitting device 20b operating with a simple configuration is used.

<<Details of Light-Emitting Device 20b>>

Figure 4:
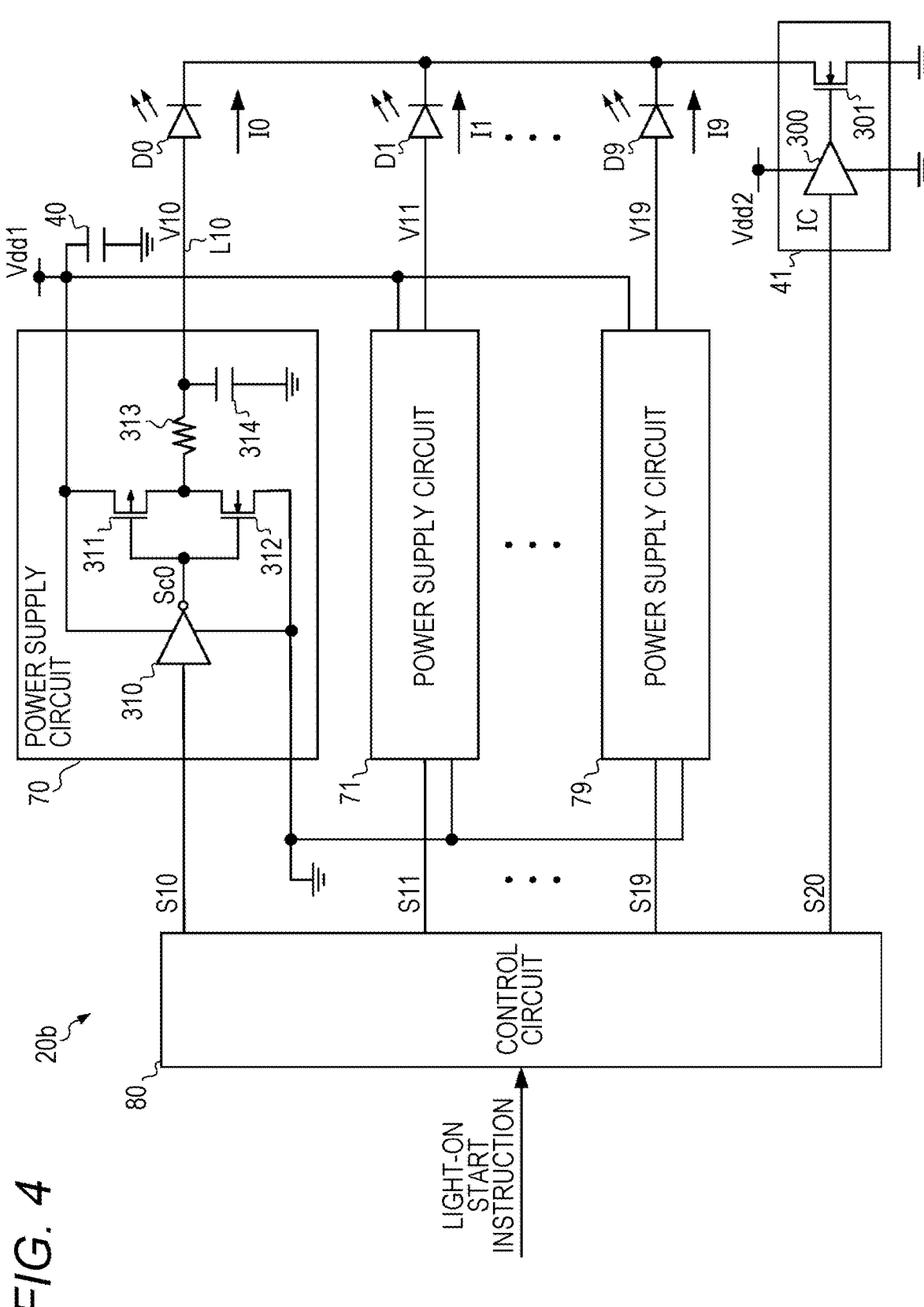
FIG. 4 is a diagram showing one example of a light-emitting device 20b.

The light-emitting device 20b shown in FIG. 4 is a device that turns on the light sources D0 to D9 on the basis of the light-on start instruction from the control device 22, and includes the light sources D0 to D9, the capacitor 40, an IC 41, power supply circuits 70 to 79, and a control circuit 80. Note that the components denoted by the same reference numerals in FIG. 4 and FIG. 2 are the same as each other. Thus, the IC 41, the power supply circuits 70 to 79, and the control circuit 80 will be mainly described. Note that in FIG. 4, for the sake of convenience, part of the configuration (light sources D2 to D8, power supply circuits 72 to 78) of the light-emitting device 20b is omitted.

IC 41

The IC 41 is a circuit that turns on the light source to which the power supply voltage is applied among the light sources D0 to D9. The IC 41 of the present embodiment is provided between the ground-side node of each of the light sources D0 to D9 and the ground. Note that the "ground-side node of the light source D0" is, for example, a node to which the cathodes of the laser diodes 100 to 115 forming the light source D0 are connected.

The IC 41 is a circuit similar to the IC 212 of FIG. 2, and includes a buffer 300 and a driving transistor 301.

Similarly to the buffer 230, the buffer 300 outputs a signal having the same logic level as that of the input signal to the driving transistor 301. In the present embodiment, a signal S20 from the control circuit 80 (described later) is input to the buffer 300. Thus, the buffer 300 turns on the driving transistor 301 on the basis of the H-level signal S20, and turns off the driving transistor 301 on the basis of the L-level signal S20.

Note that the H-level signal S20 corresponds to a "light-on instruction" for turning on the light source, and the L-level signal S20 corresponds to a "light-off instruction" for turning off the light source.

Of the driving transistor 301, the drain electrode is connected to the ground-side nodes of the light sources D0 to D9, and the source electrode is grounded. Thus, when the driving transistor 301 is turned on, a current flows through the light source to which the power supply voltage is applied among the light sources D0 to D9, and such a light source is turned on. Note that when the driving transistor 301 is turned off, the path of the current from the light sources D0 to D9 to the ground is cut off, and all the light sources D0 to D9 are turned off.

The driving transistor 301 of the present embodiment corresponds to a "switch." Note that in the present embodiment, as the "switch," an N-type field effect transistor (FET) of gallium nitride (Ga) is used for the driving transistor 301, but for example, another compound transistor or a general MOS transistor or bipolar transistor may be used.

Details of Power Supply Circuit 70

The power supply circuit 70 is a circuit that generates a power supply voltage V10 for turning on the light source D0 on the basis of a signal S10. Specifically, the power supply circuit 70 generates the power supply voltage V10 when the H-level signal S10 is input, and stops generating the power supply voltage V10 when the L-level signal S10 is input.

The power supply circuit 70 includes a buffer 310, a PMOS transistor 311, an NMOS transistor 312, a resistor 313, and a capacitor 314.

The buffer 310 operates as an inverter that outputs a signal Sc0 obtained by inverting the logic level of the signal S10. Thus, the buffer 310 outputs the L-level signal Sc0 on the basis of the H-level signal S10, and outputs the H-level signal Sc0 on the basis of the L-level signal S10.

The gate electrode of the PMOS transistor 311 is connected to the gate electrode of the NMOS transistor 312, and the drain electrode of the PMOS transistor 311 is connected to the drain electrode of the NMOS transistor 312. Thus, the PMOS transistor 311 and the NMOS transistor 312 form a so-called push-pull circuit.

In the present embodiment, when the signal Sc0 changes to the L-level, the PMOS transistor 311 is turned on, and the NMOS transistor 312 is turned off. As a result, the capacitor 314 is charged, and increases to almost the power supply voltage Vdd1 (e.g., several tens of V).

When the signal Sc0 changes to the H-level, the PMOS transistor 311 is turned off, and the NMOS transistor 312 is turned on. Thus, the capacitor 314 is discharged. Note that at this time, the charge voltage of the capacitor 314 decreases to almost 0 V.

Here, in the present embodiment, one end of the capacitor 314 is connected to the anode of the light source D0 via a line L10. Thus, the charge voltage of the capacitor 314 is the power supply voltage V10 generated by the power supply circuit 70.

In this manner, the power supply circuit 70 can generate the power supply voltage V10 for turning on the light source D0 or stop generating the power supply voltage V10 on the basis of the logic level of the signal S10.

Note that in the present embodiment, the buffer 310, the PMOS transistor 311, and the NMOS transistor 312 correspond to a "charge-discharge circuit" that charges and discharges the capacitor 314. The resistor 313 provided between the above-described push-pull circuit and the capacitor 314 is an element that limits a current for charging and discharging the capacitor 314. Further, the power supply circuit 70 corresponds to a circuit that generates the power supply voltage V10 for "one corresponding light source D0" among the light sources D0 to D9. The capacitor 314 corresponds to a "first capacitor."

Power Supply Circuits 71 to 79

Similarly to the power supply circuit 70, each of the power supply circuits 71 to 79 generates a power supply voltage V11 to V19 for the light source D11 to D19 on the basis of a signal S11 to S19. Thus, detailed description of the power supply circuits 71 to 79 is omitted here. Note that in the present embodiment, the power supply circuits 70 to 79 are each provided for the light sources D0 to D9.

Control Circuit 80

The control circuit 80 controls each of the power supply circuits 70 to 79 such that the light sources D0 to D9 are sequentially turned on the basis of the light-on start instruction from the control device 22 of FIG. 1. Specifically, the control circuit 80 sets the level of the signal for the power supply circuit corresponding to the light source to be turned on among the signals S10 to S19 to the H-level, and sets the levels of the other nine signals to the L-level.

In addition, when the light-on start instruction is input, the control circuit 80 outputs the H-level signal S20 (light-on instruction) at the timing of turning on the target light source, and outputs the L-level signal S20 (light-off instruction) at the timing of turning off the target light source.

Operation of Control Circuit 80 and Main Waveform of Light-Emitting Device 20*b*

Figure 5:
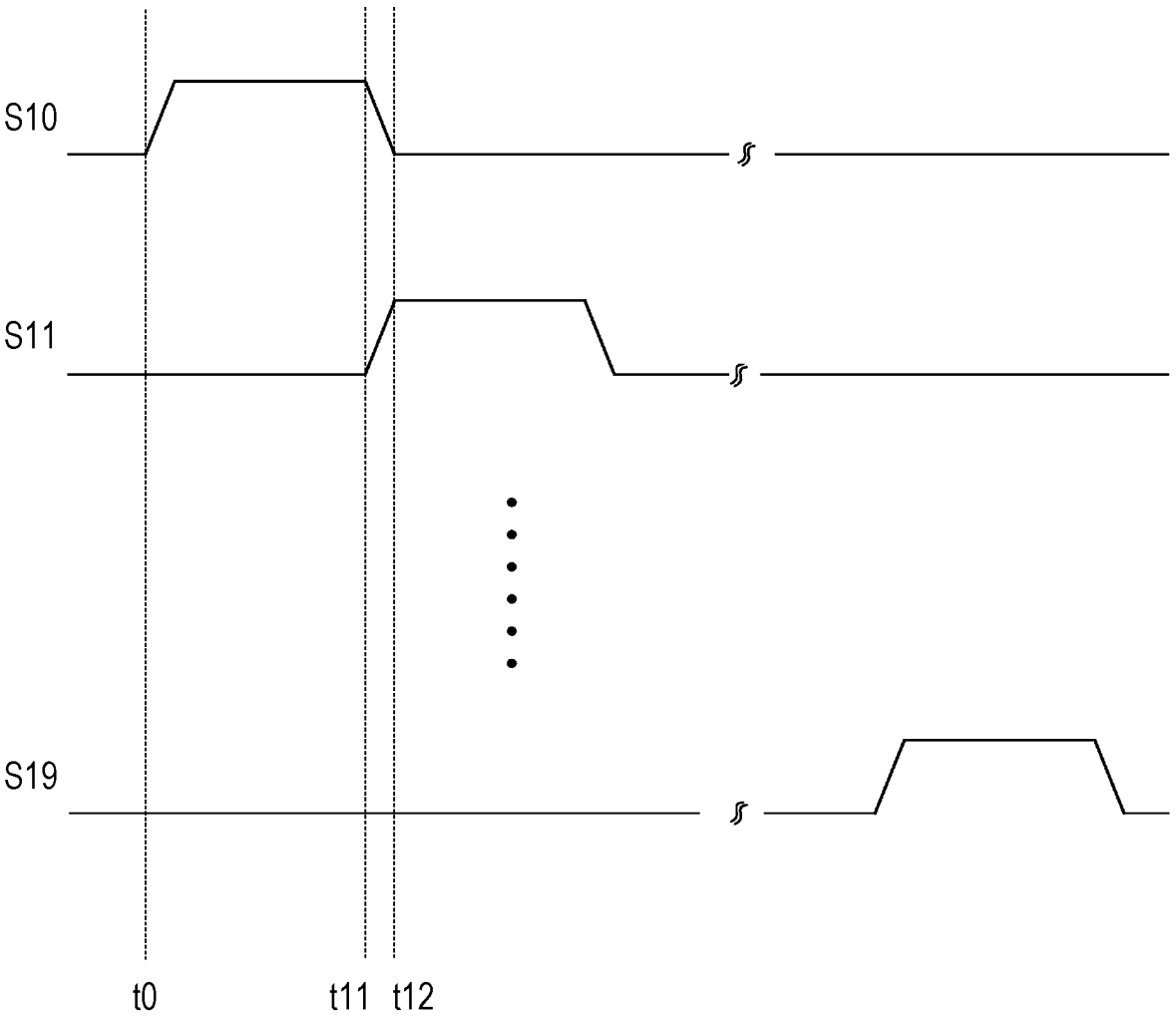
FIG. 5 is a chart for describing signals S10 to S19.
Figure 6:
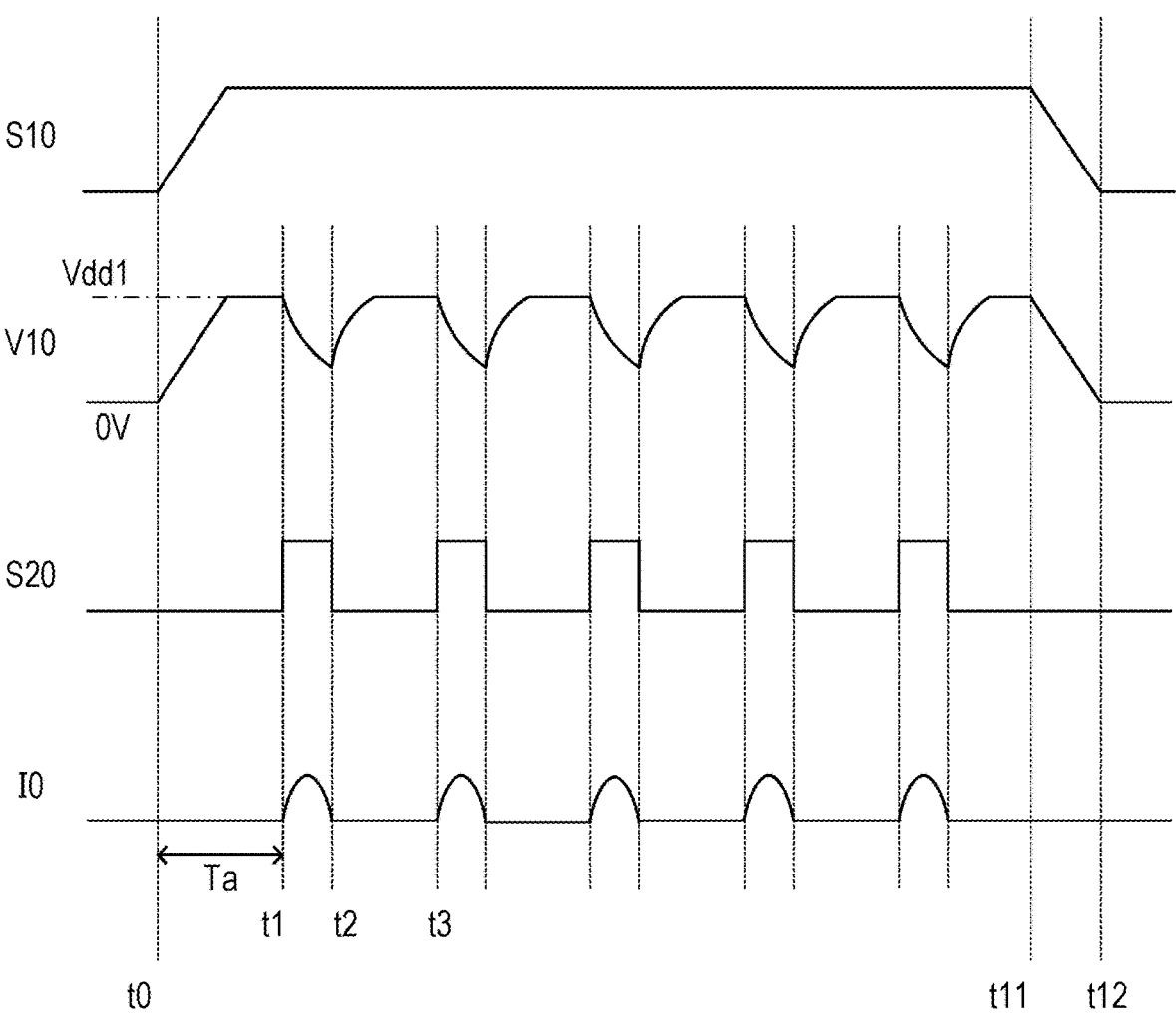
FIG. 6 is a chart for describing operation of the light-emitting device 20b.

FIG. 5 is a chart showing one example of the waveforms of the signals S10 to S19. FIG. 6 is a chart showing one example of a main waveform of the light-emitting device 20*b* when the light source D0 is turned on. Note that in FIG. 5, only the signals S10, S11, S19 are shown for the sake of convenience.

First, the control circuit 80 of FIG. 4 changes the signal S10 from the L-level to the H-level at time t0, and thus the power supply circuit 70 starts generating the power supply voltage V10. As a result, as shown in FIG. 6, the power supply voltage V10 increases from 0 V to the level of the power supply voltage Vdd1. Note that in practice, the power supply voltage V10 increases slightly after the rising timing to of the signal S10, but here, such a delay is omitted for the sake of convenience.

Further, the control circuit 80 sets each of the signals S11 to S19 to the L-level at the time t0. Thus, generation of the power supply voltages V11 to V19 of the power supply circuits 71 to 79 is stopped.

At time t1 (see FIG. 6) when a predetermined period Ta has elapsed from the time t0, the control circuit 80 outputs the H-level signal S20 to turn on the light source D0. As a result, the driving transistor 301 of the IC 41 of FIG. 4 is turned on. Thus, a current I0 flows through the light source D0, and the light source D0 is turned on.

Note that in the present embodiment, the predetermined period Ta is a period longer than a period from when the level of the power supply voltage V10 is 0 V to when the level changes to the power supply voltage Vdd1. When the current I0 flows through the light source D0, the capacitor 40 is discharged, and therefore, the power supply voltage V10 decreases from the level of the power supply voltage Vdd1.

Then, at time t2 in FIG. 6, the control circuit 80 changes the signal S20 to the L-level in order to turn off the light source DO. As a result, the driving transistor 301 is turned off. The current I0 for the light source D0 is cut off, and therefore, the light source D0 is turned off. Note that at the time t2, the current I0 is cut off and discharge of the capacitor 40 is stopped, and therefore, the power supply voltage V10 increases to the power supply voltage Vdd1.

Then, at time t3, the control circuit 80 changes the signal S20 to the H-level, and therefore, the light source D0 is turned on again. Note that in the present embodiment, the operation from the time t1 to the time t2 is repeated four times after the time t3. Note that while the power supply voltage V10 is being generated, the light source D0 is turned on five times, but the number of times of turning on the light source D0 is one example.

At time t11, the control circuit 80 changes the signal S10 to the L-level in order to stop generating the power supply voltage V10. As a result, the capacitor 314 of FIG. 4 is discharged via the resistor 313 and the NMOS transistor 312, and therefore, the power supply voltage V10 gradually decreases. Note that in practice, the power supply voltage V10 decreases slightly after the falling timing t11 of the signal S10, but here, such a delay is omitted for the sake of convenience.

As shown in FIG. 5, at the time t11, the control circuit 80 changes the signal S11 to the H-level in order to generate the power supply voltage V11. As a result, the capacitor 314 (not shown) of the power supply circuit 71 is gradually charged, and therefore, the power supply voltage V11 increases.

Note that in the present embodiment, for example, as shown at the time t11 in FIG. 5, the timing of starting discharging the capacitor 314 of the power supply circuit 70 is the same as the timing of starting charging the capacitor 314 (not shown) of the power supply circuit 71. That is, in the present embodiment, the control circuit 80 controls the power supply circuits 70, 71 such that the capacitor 314 (not shown) of the power supply circuit 71 is charged when the capacitor 314 of the power supply circuit 70 is discharged.

It is also possible to start charging the capacitor 314 (not shown) of the power supply circuit 71 after the capacitor 314 of the power supply circuit 70 has been discharged and the power supply voltage V10 gas become almost 0 V. However, in such a case, the signal S11 changes to the H-level after time t12 in FIGS. 5 and 6, and therefore, the timing of turning on the light source D1 is also delayed.

In the present embodiment, when the capacitor 314 of the power supply circuit 70 is discharged (i.e., in a period in which the level of the power supply voltage V10 decreases and is higher than 0 V), charge of the capacitor 314 of the power supply circuit 71 to be turned on next is started. Thus, in the present embodiment, the light source can be turned on at shorter intervals.

Although not shown in FIG. 5, when the above-described predetermined period Ta has elapsed from the time t11, the control circuit 80 outputs the H-level signal S20 five times as in a case where the predetermined period Ta has elapsed from the time t0 (see FIG. 6). As a result, the light source D1 is also turned on five times at the same timing as that of the light source D0. Here, the operation when the control circuit 80 turns on the light sources D0, D1 has been described, but the same also applies to the other light sources D2 to D9.

As described above, the power supply circuit 70 of the present embodiment in FIG. 4 does not include the diode 200, the capacitor 201, the transformer 211, and the IC 212 included in the power supply circuit 50 of FIG. 2. Further, the light-emitting device 20*b* controls ON/OFF of the light sources D0 to D9 by providing one IC 41 between the ground-side nodes of the light sources D0 to D9 and the ground. Thus, in the present embodiment, ON of the plurality of light sources can be controlled with a simple configuration.

Note that the H-level signals S10 to S19 of the present embodiment correspond to a "first signal," and the L-level signals S10 to S19 correspond to a "second signal." Further, for example, the power supply circuit 70 corresponds to a "first power supply circuit," and the power supply circuit 71 corresponds to a "second power supply circuit."

In order to increase the distance (hereinafter, referred to as a "measurement distance") to the object 11, which can be measured by the measurement device 10, it is necessary to strengthen the light emitted from the light source D0. In addition, in order to strengthen the light emitted from the light source D0, it is necessary to increase the current I0 for turning on the light source D0. As described above, in the light-emitting device 20*b* of FIG. 4, the discharge current for the capacitor 314 of the power supply circuit 70 is the current I0 for turning on the light source D0. Thus, when the capacity of the capacitor 314 is increased, the measurement distance of the measurement device 10 can be increased.

Figure 7:
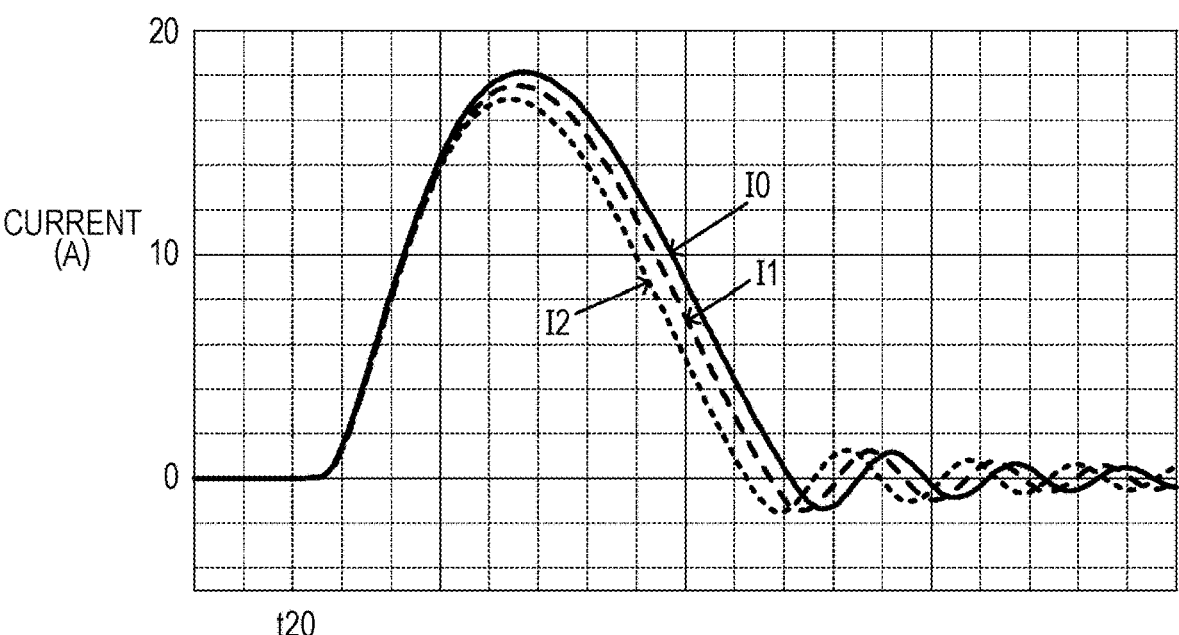
FIG. 7 is a graph showing one example of the current waveform of the light-emitting device 20b.

Note that when the capacity of the capacitor 314 is increased, a variation between the capacitors 314 included in the power supply circuits 70 to 79 generally increases. FIG. 7 is a graph showing one example of the waveforms of the currents I0 to I2 when the capacities of the capacitors 314 of the power supply circuits 70 to 72 are 2200 pF, 2000 pF, and 1800 pF, respectively.

Note that in FIG. 7, the current I0 from the capacitor 314 of 2200 pF is indicated by a solid line, the current I1 from the capacitor 314 of 2000 pF is indicated by a wide dotted line, and the current I2 from the capacitor 314 of 1800 pF is indicated by a narrow dotted line.

In addition, in FIG. 7, the timing of turning on the driving transistor 301 when the currents I0 to I2 are generated is drawn with reference t0 time t20 so that the waveforms of the currents I0 to I2 can be compared.

Here, the current I0 will be described as an example. Since the driving transistor 301 is turned on at the time t20, the current I0 increases. Then, when the capacitor 314 of the power supply circuit 70 is discharged, the current I0 decreases to zero. Thereafter, the driving transistor 301 is turned off at predetermined timing. Note that although the current I0 has been described as an example here, the same also applies to the currents I1, I2.

In the present embodiment, as shown in FIG. 7, when the capacity of the capacitor 314 is as large as 2200 pF, the peak value (approximately 18 A) of the current I0 for turning on the light source is larger than the peak value (approximately 17.5 A, approximately 17 A) of each of the current values I1 and I2. Thus, in the light-emitting device 20*b*, when the capacitor 314 having a small variation is used in each of the power supply circuits 70 to 79, the light sources D0 to D9 can be turned on with favorable accuracy. Note that by using a capacitor (e.g., capacitor smaller than 1000 pF) having a relatively-small capacity value for the plurality of capacitors 314, it is possible to reduce the variation between the plurality of capacitors 314.

<<Details of Light-Emitting Device 20*c*>>

Figure 8:
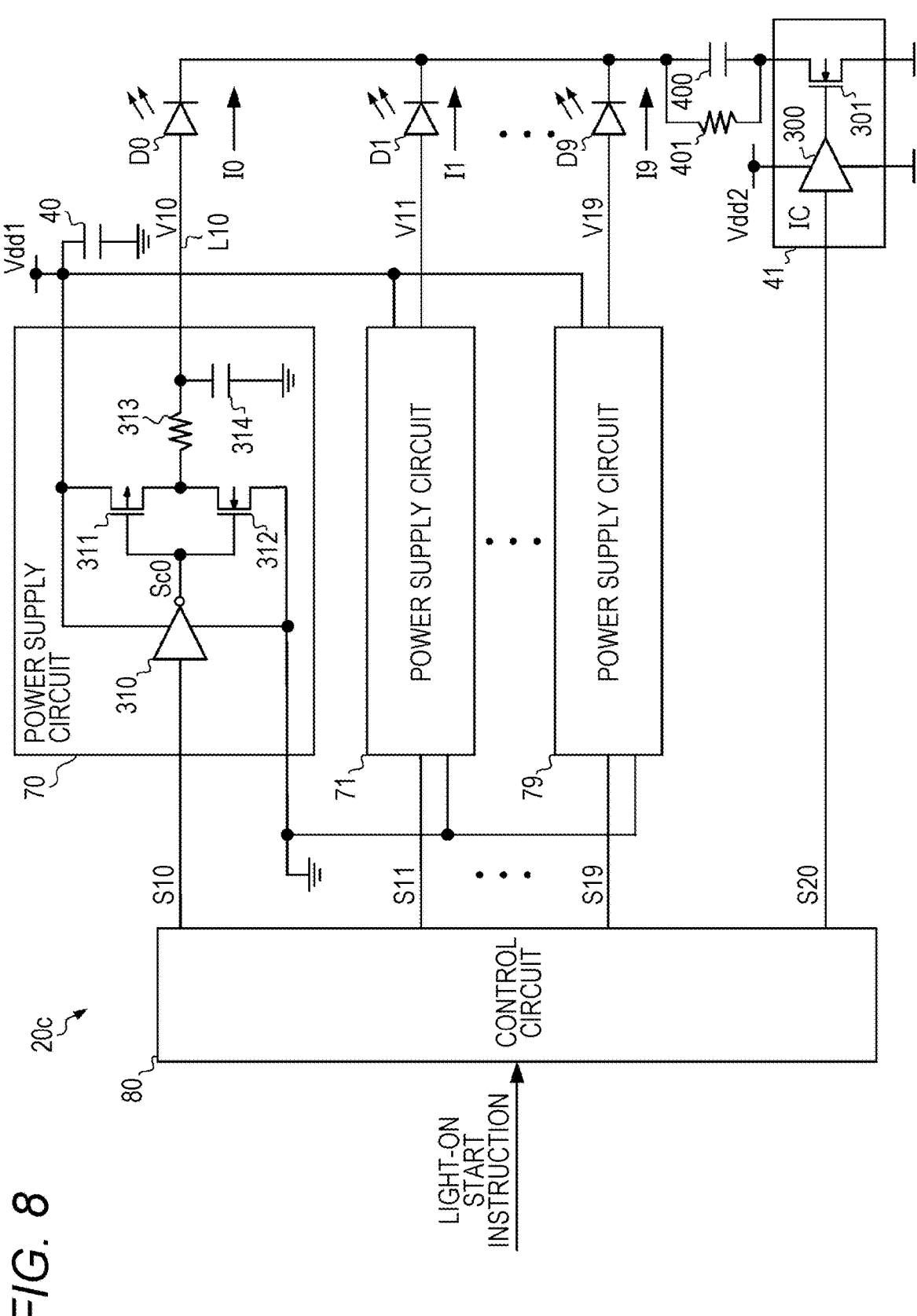
FIG. 8 is a diagram showing one example of a light-emitting device 20c.

A light-emitting device 20*c* shown in FIG. 8 is a device capable of reducing the variation in the currents I0 to I9 while increasing the peak values of the currents I0 to I9. The light-emitting device 20*c* includes the light sources D0 to D9, the capacitors 40, 400, the IC 41, the power supply circuits 70 to 79, the control circuit 80, and a resistor 401. Note that the components denoted by the same reference numerals in FIG. 8 and FIG. 4 are the same as each other. Thus, the capacitor 400, the resistor 401, and the capacitor 314 included in each of the power supply circuits 70 to 79 will be mainly described here.

The capacitor 400 is an element for determining the current values (particularly, peak values) of the currents I0 to I9 for turning on the light sources D0 to D9, and is provided between the ground-side node of each of the light sources D0 to D9 and the driving transistor 301. Specifically, one end of the capacitor 400 is connected to the ground-side node of each of the light sources D0 to D9, and the other end is connected to the drain electrode of the driving transistor 301.

The resistor 401 is an element that discharges the electric charge of the capacitor 400. Of the resistor 401, one end is connected to the ground-side node of each of the light sources D0 to D9, and the other end is connected to the drain electrode of the driving transistor 301. Thus, the resistor 401 is connected in parallel to the capacitor 400. Note that the capacitor 400 corresponds to a "second capacitor."

Current Waveform of Light-Emitting Device 20*c*

Here, the waveform of the current flowing through the light source of the light-emitting device 20*c* will be described. In the present embodiment, the capacity of the capacitor 400 is, for example, 2000 pF, and a capacitor (e.g., 0.1 µF) sufficiently larger in a capacity than 2000 pF is used for the capacitor 314 of each of the power supply circuits 70 to 79.

Note that there is the variation between the capacitors 314 of the power supply circuits 70 to 79. In the present embodiment, it is assumed that the capacity of the capacitor 314 of the power supply circuit 70 is, for example, 0.11 µF, the capacity of the capacitor 314 of the power supply circuit 71 is, for example, 0.1 µF, and the capacity of the capacitor 314 of the power supply circuit 72 is, for example, 0.09 µF.

Further, the currents I0 to I2 flowing through the light sources D0 to D2 will be described here with reference to FIG. 9. Note that in FIG. 9, the current I0 is indicated by a solid line, the current I1 is indicated by a wide dotted line, and the current I2 is indicated by a narrow dotted line. Although details will be described later, in the present embodiment, the waveforms of the currents I0 to I2 are substantially the same as each other, and therefore, three current waveforms overlap with each other in FIG. 9.

Figure 9:
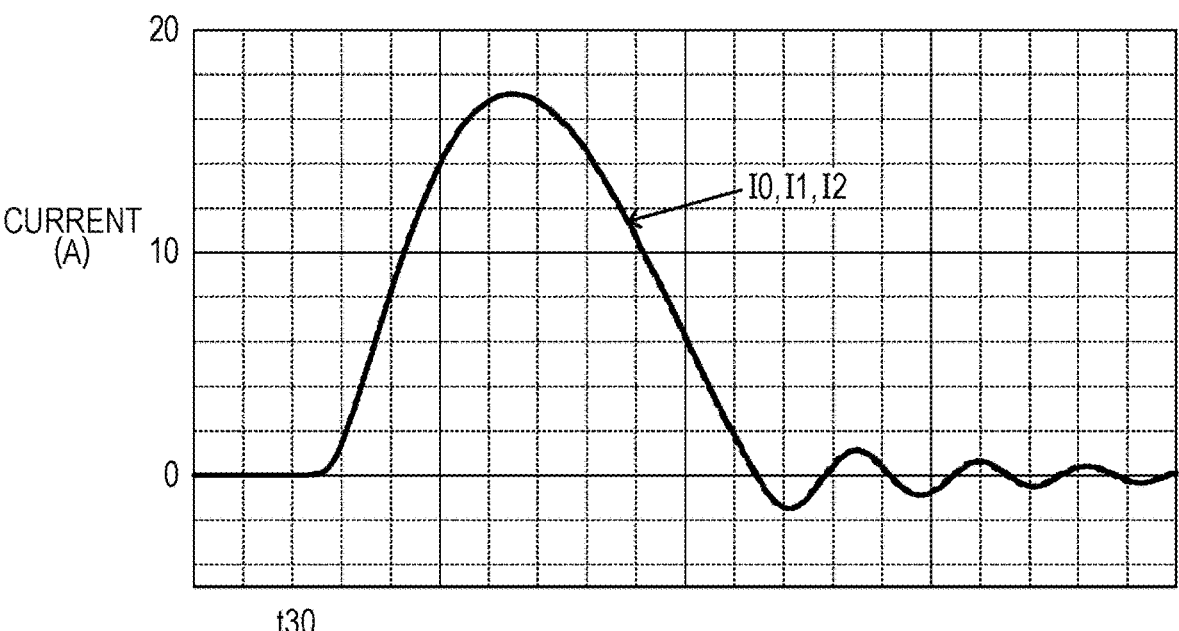
FIG. 9 is a graph showing one example of the current waveform of the light-emitting device 20c.

In a state in which the power supply circuit 70 of FIG. 8 generates the power supply voltage V10 (i.e., the signal S10 is in the H-level state), for example, when the signal S20 changes to the H-level at time t30 in FIG. 9, the driving transistor 301 is turned on.

As a result, the capacitor 314 of the power supply circuit 70 is discharged, and the charge current for charging the capacitor 400 increases. In the present embodiment, the charge current for the capacitor 400 is the current I0 for turning on the light source D0, and therefore, the current I0 increases.

Thereafter, the capacitor 400 is gradually charged, and when the current I0 reaches the peak value, the current I0 decreases. Then, the discharged capacitor 314 is charged, and therefore, the current I0 decreases to almost zero. Thereafter, the driving transistor 301 is turned off at predetermined timing. Note that when the driving transistor 301 is turned off, the capacitor 400 is discharged via the resistor 401.

Here, the current I0 when the power supply circuit 70 generates the power supply voltage V10 has been described. However, as shown in FIG. 9, the waveforms of the currents I1, I2 when the power supply circuits 71, 72 generate the power supply voltages V11, V12 are also the charge current for the capacitor 400. Thus, as shown in FIG. 9, the currents I0 to I2 have substantially the same waveform.

As described above, in the light-emitting device 20c, when the capacity of the capacitor 314 included in each of the power supply circuits 70 to 79 is sufficiently larger than the capacity of the capacitor 400, the waveforms and peak values of the currents I0 to I9 are determined by the capacity of the capacitor 400. Thus, in the light-emitting device 20c, even when the measurement distance is increased, the variation in the currents I0 to I9 can be reduced.

Note that when the measurement distance is relatively short, the capacity of each of the plurality of capacitors 314 of the power supply circuits 70 to 79 in the light-emitting device 20b of FIG. 4 can be decreased. In such a case, the variation between the plurality of capacitors 314 of the power supply circuits 70 to 79 is also generally reduced, and therefore, the variation in the intensity of the light emitted from the light sources D0 to D9 is also reduced. Thus, when the measurement distance is relatively short, the light-emitting device 20b can be used.

Other Embodiments

In the present embodiment, the VCSEL is used for each of the light sources D0 to D9, but the present invention is not limited thereto and, for example, a light emitting diode may be used. Even when the light emitting diodes are used as the light sources D0 to D9, a light-emitting device can be provided with a simple configuration as in the present embodiment.

SUMMARY

The measurement device 10 of the present embodiment has been described above. In the light-emitting device 20b, the driving transistor 301 is provided between the ground-side nodes of the light sources D0 to D9 and the ground. Thus, when the driving transistor 301 is turned on while the power supply voltage is being supplied to the target light source, the target light source can be turned on. Consequently, the light-emitting device 20b can turn on the plurality of light sources with a simple configuration with a less number of components.

Further, in the light-emitting device 20b, for example, when the power supply circuit 70 generates the power supply voltage V10, the power supply circuits 71 to 79 discharge the capacitors 314 (not shown) therein. Thus, when the driving transistor 301 is turned on, only a desired light source of the plurality of light sources can be turned on. In addition, when the measurement distance is relatively short, the variation between the capacitors 314 of the power supply circuits 71 to 79 is reduced. Thus, in such a case, the light-emitting device 20b can be used.

In the power supply circuit 70, the resistor 313 is provided between the capacitor 314 and the push-pull circuit including the PMOS transistor 311 and the NMOS transistor 312.

Thus, the charge current and discharge current for the capacitor 314 can be limited to appropriate current values. Further, as a component forming the power supply circuit 70, a low power type component can be used as compared with a component forming the power supply circuit 50.

For example, as shown in FIGS. 4 and 5, the control circuit 80 controls the power supply circuits 70, 71 such that the capacitor 314 (not shown) of the power supply circuit 71 is charged when the capacitor 314 of the power supply circuit 70 is discharged. That is, in the present embodiment, generation of the power supply voltage V11 is started before the power supply voltage V10 reaches 0 V, and therefore, the light source D1 can be smoothly turned on after the light source D0 has been turned off.

In the light-emitting device 20c, the capacitor 400 and the resistor 401 are provided between the light sources D0 to D9 and the driving transistor 301. Thus, in the light-emitting device 20c, the charge current for the capacitor 400 is the currents I0 to I9, and therefore, the variation in the currents I0 to I9 can be reduced.

In the light-emitting device 20c, the capacity of the capacitor 314 of each of the power supply circuits 70 to 79 is larger than the capacity of the capacitor 400. Thus, the capacitor 314 can supply a sufficient current to the capacitor 400.

For example, in the light-emitting device 20c, the capacity of the capacitor 400 is, for example, 1000 pF or more. As a result, in the light-emitting device 20c, the peak values of the currents I0 to I9 can be increased so that the measurement distance can be increased.

Although the VCSEL can be used as the light source D0, for example, a light emitting diode having a cathode and an anode may be used as in the VCSEL. In such a case, the light source D0 includes the light emitting diode and the optical member 120.

The above-described embodiments are for the sake of easy understanding of the present invention, and are not intended to limit the present invention. In addition, the present invention can be changed or modified without departing from the gist thereof, and the present invention includes equivalents thereof, needless to say.

The present international application claims priority based on Japanese Patent Application No. 2022-093042 filed on Jun. 8, 2022 and Japanese Patent Application No. 2022-112517 filed on Jul. 13, 2022, and the entire contents of Japanese Patent Application No. 2022-093042 and Japanese Patent Application No. 2022-112517 are incorporated herein by reference.

The description of the specific embodiments of the present invention is presented for the purpose of illustration. The specific embodiments are not intended to be exhaustive or to limit the invention as it is in the form described. It is obvious to those skilled in the art that many modifications and alterations are possible in light of the contents of the description above.

LIST OF REFERENCE SIGNS

10 Measurement Device
11 Object
20, 20a, 20b Light-Emitting Device
21 Light Receiving Device
22 Control Device
40, 201, 314, 400 Capacitor
41, 212 IC
50 to 59 Power Supply Circuit
60 Control Circuit 100 to 115 Laser Diode
120 Optical Member
200 Diode
210, 230, 300, 310 Buffer
211 Transformer
213, 313, 401 Resistor
220 Primary Coil
221 Secondary Coil
231, 301 Driving Transistor
312 NMOS Transistor
311 PMOS Transistor
D0 to D9 Light Source

The invention claimed is:

1. A light-emitting device comprising:
n (n≥2) light sources;
n power supply circuits each provided for the n light sources, each of the n power supply circuits includes:
  a first capacitor that generates the power supply voltage, and
  a charge-discharge circuit that charges the first capacitor on the basis of the first signal and discharges the first capacitor on the basis of the second signal;
a switch provided between a ground-side node of each of the n light sources and a ground;
a second capacitor provided between the ground-side node of each of the n light sources and the switch; and
a resistor connected in parallel to the second capacitor,
wherein each power supply circuit generates a power supply voltage for a corresponding one of the n light sources on the basis of a first signal, and stops generating the power supply voltage on the basis of a second signal,
the switch is turned on on the basis of a light-on instruction and is turned off on the basis of a light-off instruction when the power supply voltage for the one light source is generated, and
a capacity of the first capacitor is larger than a capacity of the second capacitor.

2. The light-emitting device according to claim 1, further comprising
wherein the resistor is provided between the charge-discharge circuit and the first capacitor.

3. The light-emitting device according to claim 2, further comprising:
a control circuit that outputs the first and second signals to each of the n power supply circuits and controls each of the n power supply circuits,
wherein the control circuit
controls first and second power supply circuits of the n power supply circuits such that the first capacitor of the second power supply circuit is charged when the first capacitor of the first power supply circuit is discharged.

4. The light-emitting device according to claim 1, wherein the capacity of the second capacitor is 1000 pF or more.

5. The light-emitting device according to claim 1, wherein the light source includes any of a laser diode or a light emitting diode, and an optical member that adjusts distribution of light from the any of the laser diode or the light emitting diode.

* * * * *